United States Patent [19]

Baumann

[11] 4,399,834

[45] Aug. 23, 1983

[54] CHEMICALLY INERT CONTROL VALVE

[76] Inventor: Hans D. Baumann, 32 Pine St., Rye, N.H. 03870

[21] Appl. No.: 308,149

[22] Filed: Oct. 5, 1981

[51] Int. Cl.³ .............................................. F16L 7/00
[52] U.S. Cl. ................................. 137/375; 251/172; 251/324; 251/214
[58] Field of Search ............... 137/375; 251/172, 190, 251/324, 148

[56] References Cited

U.S. PATENT DOCUMENTS 1,981,825 11/1934 Miller, Jr. .......................... 137/375
3,647,179 3/1972 Scaramucci ........................ 251/172

Primary Examiner—Martin P. Schwadron
Assistant Examiner—Sheri M. Novack

[57] ABSTRACT

A control valve, the internal wetted working parts of which are made of corrosion resistant material and which are completely enclosed by and easily removed from a steel or stainless steel pressure vessel, and which is capable of tight shut-off when subjected to fluid differential pressure.

8 Claims, 3 Drawing Figures

CHEMICALLY INERT CONTROL VALVE

BACKGROUND OF THE INVENTION

This invention relates to a flow control or modulating valve commonly used in chemical process plants or paper mills. Specifically, this invention also relates to a further improvement of the Chemically Inert Control Valve now patened under U.S. Pat. No. 4,214,730. The major improvement of my new invention over the previous patent is the increase in available flow capacity by providing a direct "line of sight" valve construction and, in addition, providing a valve design where the sealing mechanism is pressure assisted, that is, the seal tightness is improved with increase in valve differential pressure.

Valves of this type are usually positioned by pneumatic disphragm actuators in response to a positioning signal from a control instrument of conventional art. The control of highly corrosive media used for the control of the PH level for bleaching paper or waste water, for example, poses special problems for the process control engineer, since very few materials will resist the strong chemical attack by those media. Plastic materials, such as Teflon*, show nearly perfect inertness, yet are not capable to serve as pressure vessels, i.e., to withstand the working pressure of the controlled medium nor the mechanical stress imposed by the connected piping. It has, therefore, been customary to clad inert valve parts with metal, i.e., to place all working parts of such a valve in a metal shell, usually Type 316 stainless steel.

*Tetrafluoroethylene

Prior art valves of this type have conventional plug and seat rings, both made from rigid Teflon. The conventional shape of such valves poses great difficulties on the metal cover design and the supporting metal cover or shroud is usually composed of several separate and interconnecting parts, in order to be able to properly support and protect the internal or wetted valve portion. Such relatively complicated arrangements are, therefore, neither safe nor economical to produce.

My invention has for an important object to provide for a chemically inert, or Teflon valve which is simple to insert into a one piece shroud or metal cover.

A further object is to provide a flangeless or wafer style valve which is easy to install in a pipe system and without need for additional pipe flange gaskets.

Furthermore, my invention allows the use of a fluid pressure actuated valve seat which is self-adjusting, if slightly worn, without need to remove the valve from service.

Finally, yet another objective of my invention is the ability to provide a valve capable of regulating even very minute amounts of flow without being affected by the limitations posed upon conventional Teflon valve plug-seat combinations, i.e., stickiness caused by thermal expansion or seizing due to interference fit of these identical material parts.

These and other objects, features, and advantages of the present invention will be understood from the following detailed description:

DESCRIPTION

Figure 1:
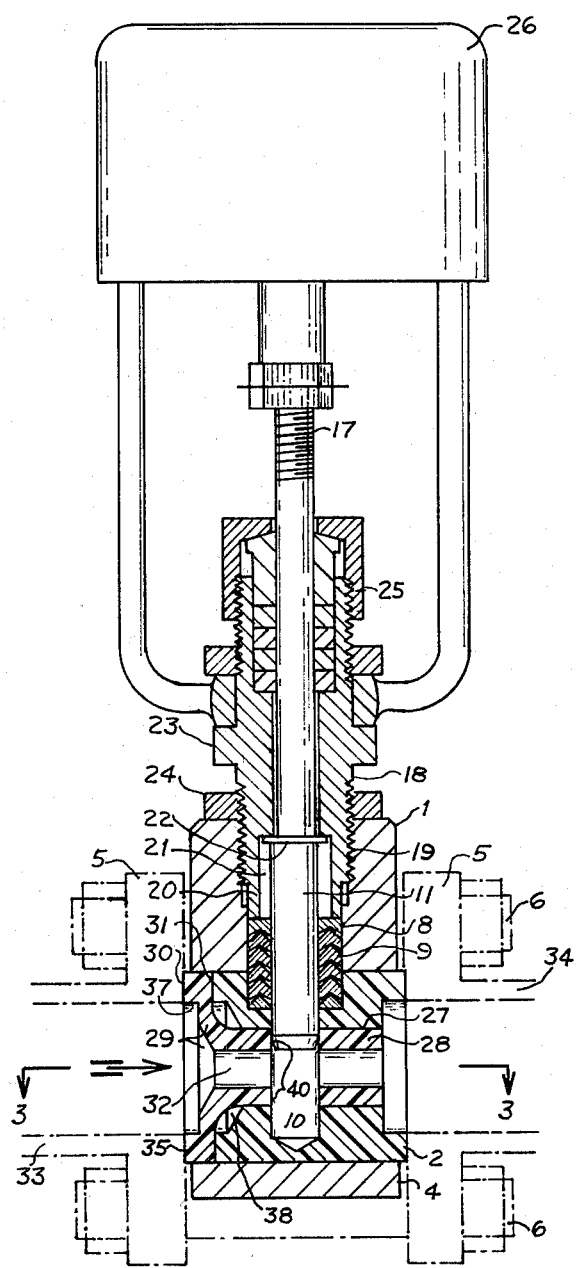
FIG. 1 is a vertical section of a preferred embodiment of the invention.
Figure 3:
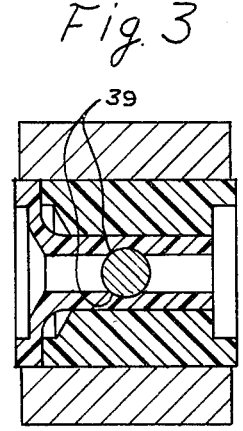
FIG. 3 is a central cross-sectional view taken along line 3—3 of FIG. 1.

The subject invention comprises a metal valve housing 1, preferably made from corrosion resistant steel such as AISI Type 316. The housing serves as a retainer and pressure supporting frame for plastic insert 2 made from a chemically inert material such as Teflon. Note, that the insert 2, fitting tightly into a perpendicular bore of housing 1, extends slightly above the width of housing 1 at one end portion 4, in order to serve as contact or gasket surface against adjacent line flanges 5 (shown here dashed) constituting parts of a pipeing system. Insert 2, in turn, has a horizontal bore 27, which is occupied by a sliding spool 28 connected by a flexible wall section 29 to a flanged portion 30 whose inner surface 31 abutts the second end portion of insert 2. A central port opening 32 extends through the length of spool 28 and constitutes a valve orifice capable of conducting field from inlet pipe 33 to outlet pipe 34. The outer surface 35 of flange portion 30 extends slightly above the width of housing 1 in order to serve as inlet gasket surface.

Figure 2:
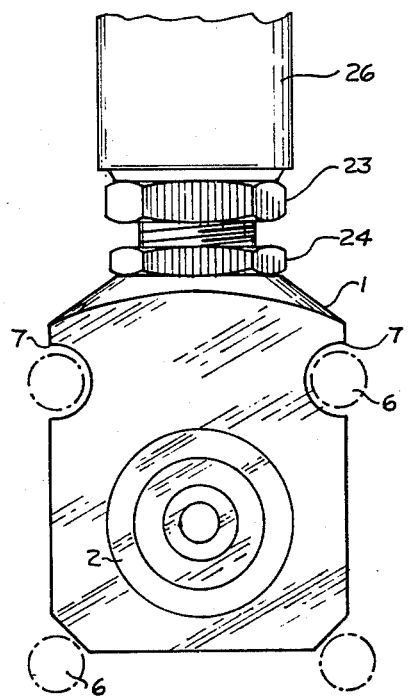
FIG. 2 is an end view of the invention shown in FIG. 1.

Both flanges 5 are connected by conventional tie rods 6 which, when tightened, compress gasket surfaces 4 and 35 to form an effective seal to prevent fluid from leaving the pipe system, in addition to retaining housing 1 within the pipeing system. Guiding slots 7 are provided within housing 1 for the tie rods 6 (shown in FIG. 2) to serve for centering housing 1 in relation to flanges 5.

Referring back to FIG. 1, a vertical central bore 8 intersects both housing 1 and insert 2 to receive a number of stacked V-shaped packing rings 9, preferably made from Teflon and having a reduced diameter bore 10 which extends into the lower parts of insert 2 and which engages a sliding valve plug 11. Plug 11 is made of a highly corrosion resistant material such as Titanium or preferably Tantalum, not excluding materials such as glass or ceramics. The smaller bore 10 located co-axial with bore 8 extends through packing rings 9, insert 2, and spool piece 28 to allow downward travel of plug 11. In the retracted position of plug 11, as shown, port opening 32 is unblocked to permit fluid to pass freely through the invented valve. Upon downstroke of plug 11, fluid passage 32 is blocked successively till shut-off is achieved.

It has to be realized that inserting sliding cylindrical valve plug 11 into conduit 10 will not in itself provide drop tight closure. It is for this tightening purpose that spool piece 28 is allowed to be motivated against the outer cylindrical surface of plug 11 by fluid forces acting on the flexible portion 29 extending inwards from recess 37. A similar recess 38 in insert 2 allows such freedom of motion of flexible portion 29 which, in turn, forces spool piece 28 towards the downstream side, and to cause tight and intimate contact of wall surfaces 39 and 40 against plug 11. It should be realized that the higher the fluid differential pressure, the higher the contact or sealing pressure is against plug 11. This capability of movement of spool piece 28 will also compensate for wear of surfaces 39 and 40.

The fluid flow is stopped, whenever plug 11 is brought down by means of a suitable actuating device 26 of conventional art connected through a valve stem 17, and when the fully cylindrical shape of plug 11 closes the passage 32 which now serves a function comparable to a valve port in a conventional plug and orifice type valve.

All packing rings 9 are of commercially available design and are called "Chevron Rings." They have elastically deformable lips on their outer and inner circumferences which increase their sealability with increased pressure differential. The use of these commercially available and inexpensive packing rings allows for low cost seal ring replacement in case of wear. While the lowest packing ring serves to seal insert 2 against housing 1, the upper rings prevent escape of fluid along the upper portion of valve plug 11.

The compression of packing rings 9 is accomplished by means of valve bonnet 18, the lower portion 19 of which is threadingly engaged with housing 1 and the lower terminating end 20 of which contacts packing rings 9. A recess 21 within the lower bonnet portion is cooperating with a metal washer 22, suitably fastened to the upper part of plug 11, to serve to limit the upward stroke of plug 11.

For any given inlet pressure, rotation of bonnet 18 by means of a hex portion 23 enables the valve assembler to compress packing rings 9 sufficiently to prevent leakage by plug 11. Such adjustment is possible even while the valve is in actual service as part of a piping system, thus enabling the user to compensate for minor wear of packing rings 9 due to severe operating conditions. The final location of bonnet 18 in respect to packing 9 is then fixed by means of a locknut 24.

As added safety feature, bonnet 18 m incorporate a conventional stuffingbox arrangement 25 primarily used to seal stem 17 for case of failure of packing 9.

While the invention has been described in light of an illustrated preferred embodiment, numerous changes may be made both in the design or in the selection of materials without departing from the scope of the following claims:

I claim:
1. Chemically inert control valve comprising
 (a) housing having a longitudinal central bore extending throughout its lengths;
 (b) inlet and outlet ends formed on said housing, said inlet and outlet ends adapted to be coupled in a pipe line;
 (c) a tubular cylindrical insert having a central port and two terminating ends at least one of which being recessed, removably received in said central bore;
 (d) sealing means slidingly arranged inside the central port of said tubular insert and comprising a spool member attached to a flexible web portion connected to an outer flange which abutts one of the terminating and recessed ends of said tubular insert and being arranged to allow fluid differential pressure to deflect said web portion and thereby allow a sliding displacement of said spool member within the central port of said insert;
 (e) a central perpendicular cross-bore intersecting said housing, insert and spool member and having an enlarged diameter portion within said housing and insert containing a tubular packing arrangement;
 (f) a plug slidably engaged within said packing arrangement and said perpendicular cross-bore, one lower terminating end of said plug arranged to selectively engage or disengage the spool member portion of said sealing means;
 (g) means to position said plug;
 (h) means to compress said packing arrangement.

2. Chemically inert control valve comprising according to claim 1, wherein said plug incorporates at its lower terminating end a reduced cross-sectional portion to affect the rate of fluid passing through said spool member when retracted.

3. Chemically inert control valve comprising according to claim 1, wherein said insert extends in length beyond the housing to engage sealingly with said piping system.

4. Chemically inert control valve comprising according to claim 1, wherein means for compressing said packing arrangement comprises a bonnet having a central longitudinal bore and which is threadingly engaged within said housing.

5. Chemically inert control valve comprising according to claim 4, wherein said bonnet contains additional packing means.

6. Chemically inert control valve comprising according to claim 1, wherein said means for positioning said valve plug consists of a valve stem suitably fastened to the upper terminating end of said plug.

7. Chemically inert control valve comprising according to claim 6, wherein additional means for limiting valve stroke are incorporated between the valve stem and plug.

8. Chemically inert control valve comprising according to claim 4, wherein the lower terminating endof said bonnet having a recessed enlarged bore whose terminating end is spaced to retain the means for limiting valve travel incorporated between valve stem and plug.

* * * * *